United States Patent [19]

Rockwell

[11] Patent Number: 5,201,082

[45] Date of Patent: Apr. 13, 1993

[54] GRAY WATER TOILET SYSTEM

[76] Inventor: Daniel J. Rockwell, 47 Sun River, Cascade Rd., Sun River, Mont. 59483

[21] Appl. No.: 762,479

[22] Filed: Sep. 19, 1991

[51] Int. Cl.⁵ .............................. E03C 1/01; E03D 5/10; E03D 11/10
[52] U.S. Cl. ........................................... 4/665; 4/406; 4/434; 4/DIG. 3
[58] Field of Search .................... 4/313, 366, 367, 406, 4/407, 434, 435, 665, DIG. 3, 378

[56] References Cited

U.S. PATENT DOCUMENTS

| 260,953 | 7/1882 | Demarest | 4/434 |
|---|---|---|---|
| 1,281,457 | 10/1918 | Whitney | 4/435 X |
| 1,626,255 | 4/1927 | Roth | 4/DIG. 3 |
| 5,036,553 | 8/1991 | Sanderson | 4/313 |
| 5,084,920 | 2/1992 | Kimball | 4/665 |

FOREIGN PATENT DOCUMENTS

| 624668 | 8/1961 | Canada | 4/435 |
|---|---|---|---|
| 3434267 | 3/1986 | Fed. Rep. of Germany | 4/665 |
| 3932022 | 11/1990 | Fed. Rep. of Germany | 4/665 |

Primary Examiner—Henry J. Recla
Assistant Examiner—Robert M. Fetsuga
Attorney, Agent, or Firm—Richard C. Conover

[57] ABSTRACT

A toilet system designed to use recycled "gray water". The toilet includes a toilet reservoir positioned above a toilet bowl with a first conduit connecting the reservoir with the bowl. A sinkable sphere, which acts as a discharge valve for the reservoir, seats on an inner surface of a cone-shaped, resilient valve seat positioned on top of the first conduit. A valve lifter is positioned below the sphere to selectively lift the sphere off the valve seat to open the reservoir valve and drain "gray water" into the bowl. The toilet bowl also has a bowl valve for releasing "black water" from the toilet bowl through a second conduit. Controls are provided to permit an operator to independently control both the "gray water" coming into the toilet bowl and the "black water" exiting the toilet bowl.

1 Claim, 3 Drawing Sheets

GRAY WATER TOILET SYSTEM

BACKGROUND OF THE INVENTION

This invention relates to an improved apparatus for use with a toilet and more specifically to an apparatus for using water with suspended particulate matter as the cleansing fluid while flushing a toilet.

In waste water management two categories of water quality have been established, "black water" which includes human waste in the sewerage, and "gray water" which includes all waste water being handled by residential or building sewerage systems except "black water". Reclaiming systems have been used to recycle "gray water" from showers, sinks, washing machines, and other similar devices that use water. In the past reclaiming "gray water" for use with toilets has generally involved collecting the "gray water", filtering it to remove the larger suspended particles, and then introducing the filtered "gray water" to a toilet reservoir. Typical systems for introducing filtered "gray water" to a toilet reservoir are shown in U.S. Pat. No. 3,318,449 and U.S. Pat. No. 3,594,825. A problem still remains in that the filters used with these systems have to be cleaned periodically. Cleaning filters is a dirty, time-consuming task. Cleaning filters can also be a dangerous task if the operator does not take precautions to protect himself from the bacteria which can live in a typical sewerage system. A system that does not get clogged by the suspended particles in "gray water" could eliminate the need for filtering.

Studies have shown that approximately 33% of the water used in a household is used to flush toilets. Flushing a conventional toilet uses a relatively fixed amount of water, typically several gallons. With a conventional toilet, contents of a toilet reservoir drain into a toilet bowl when a reservoir valve is opened. Once most of the water has drained, the reservoir valve closes. In the bowl of a conventional toilet a dam, rather than a valve, controls the level of water collected in the bowl. Sufficient water has be to flushed through the bowl so that at the end of a flush some of the water is trapped by the dam to prevent gasses from flowing back into the bowl from the sewerage system. The trapped water also helps to keep the bowl clean as excrement drops into the bowl. But this structure has no way of independently draining the bowl of liquid wastes since the dam is of a fixed height.

There are other controls sometimes used in the bowl of a toilet other than a dam. Marine toilets, such as shown in U.S. Pat. No. 1,278,665, provide check valves in the discharge path to prevent "black water" sewerage from coming back into the bowl. These valves are controlled by pressure differentials between a pump and a discharge port to make sure that the "black water" flows overboard or to some other separate sewerage disposal system. But check valves do not provide an independent way of draining the bowl. Check valves also do not aid in conserving water since they only keep fluid flowing in one direction.

From the above it can be seen that a need exists for a "gray water" recycling system which can recycle "gray water" for use in a toilet without first filtering the "gray water". The toilet must be capable of using "gray water" with suspended particulate matter as a source of flushing water while not clogging the valves located between the toilet reservoir and the toilet bowl or between the toilet bowl and a discharge port. A need also exists for a way of controlling the release of "black water" from the bowl independently from the way of controlling water entering the toilet bowl so that water can be conserved when flushing only liquids from the bowl.

SUMMARY OF INVENTION

The present invention relates to an apparatus for use with a toilet to use recycled "gray water" in the toilet. The toilet has a toilet reservoir positioned above a toilet bowl with a first conduit connecting the reservoir with the bowl. A reservoir valve controls the release of "gray water" from the reservoir. The reservoir valve includes a sinkable sphere which seats on the inner surface of a cone-shaped, resilient valve seat. The valve seat is positioned on top of the first conduit with a longitudinal axis of the cone-shaped valve seat extending generally vertical. The valve seat also has an opening into the first conduit positioned adjacent the bottom and at the narrowest part of the cone-shaped seat which opening is sized smaller than the diameter of the sphere. A valve lifter is positioned below the sphere and has an extendable stem which can lift the sphere off the valve seat to open the reservoir valve. The structure of the reservoir valve prevents suspended particulate matter in the "gray water" from clogging the reservoir valve when the sphere is raised and "gray water" is released from the reservoir.

The toilet bowl also has an independently operated bowl valve which is used for releasing "black water" from the toilet bowl. The bowl valve can be used alternatively to drain the contents of the bowl without having "gray water" released from the reservoir; or the bowl valve can be used to flush the toilet where "gray water" drains into the bowl and the bowl valve remains open a predetermined time as "black water" exits the bowl. Controls are provided for an operator to select 'water only' to only release "gray water" into the bowl, 'flush' to release "gray water" into the bowl and also drain "black water" from the bowl, and 'drain' to only drain "black water" from the bowl. By using the controls to manage the flow of water through a toilet, an operator can control both the amount of water coming into a toilet and the amount of "black water" exiting a toilet. Water is conserved by using "gray water" as the flushing medium and by controlling the flow of water through the bowl.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
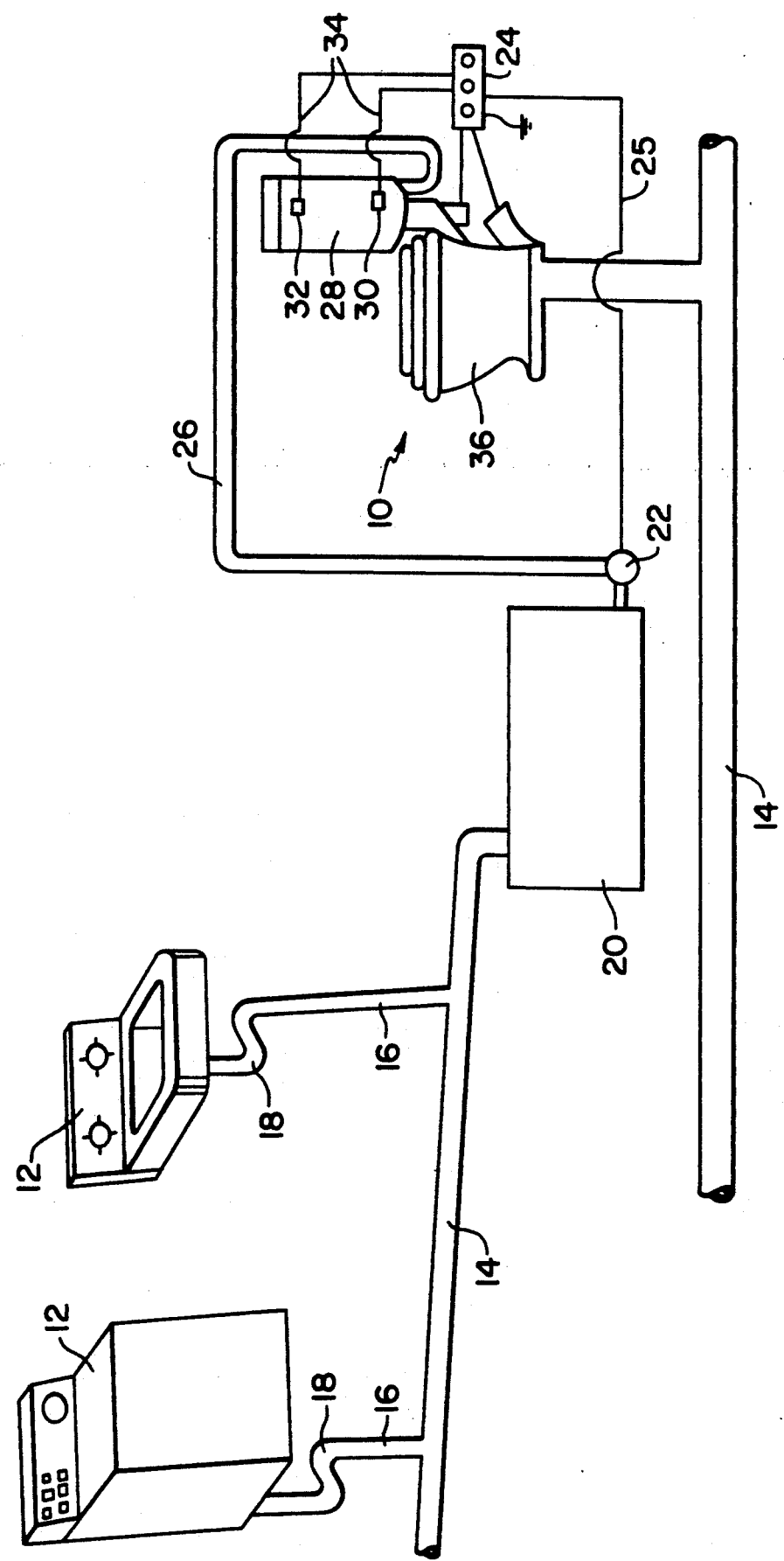
FIG. 1 is schematic view of a "gray water" disposal system incorporating the present invention.
Figure 2:
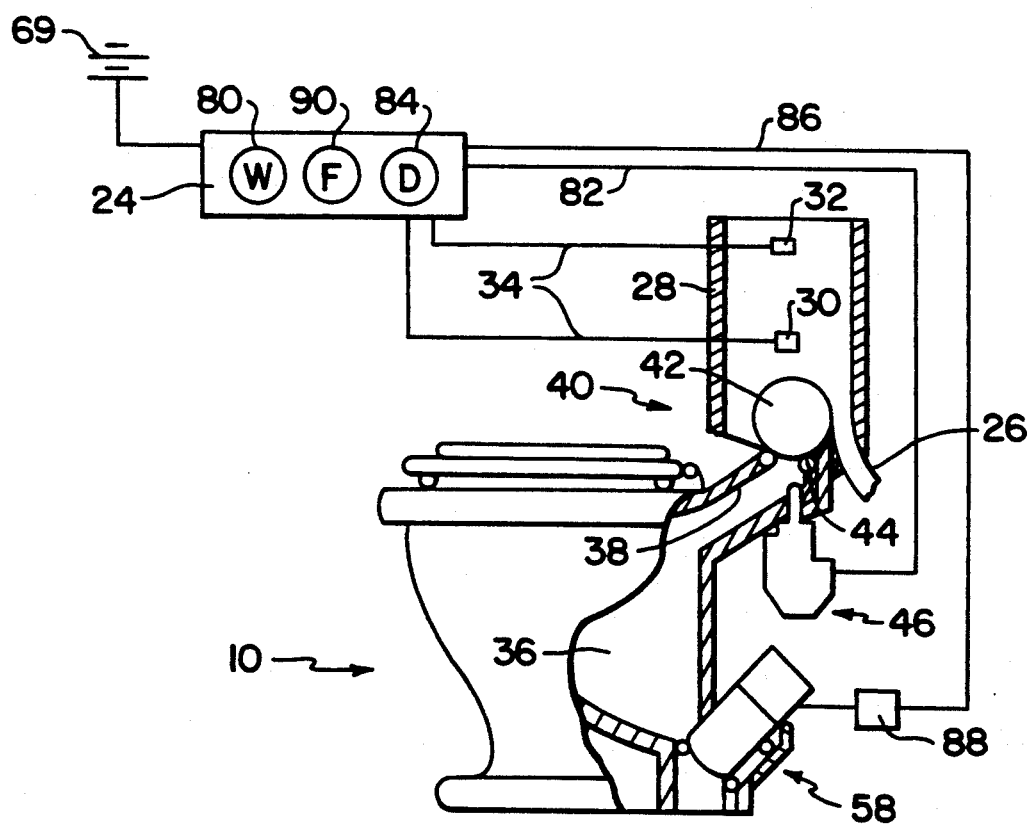
FIG. 2 is an elevational view of a toilet incorporating the present invention as shown in FIG. 1 with parts broken away.

A preferred embodiment of a "gray water" system including a toilet 10 incorporating the present invention is shown in FIG. 1. Water using devices 12 are connected to a conventional drain pipe 14 through pipes 16 having U-shaped traps 18. Waste water from all water using devices 12 except toilets is directed through drain pipe 14 to collecting tank 20 where "gray water" is stored. A pump 22, sealingly connected within the interior of collecting tank 20, is activated by control signals from control box 24 sent over wires 25. Pump 22 is also selected so that "gray water" having particulate matter suspended therein can be pumped into outlet pipe 26.

The output of pump 22 is directed through pipe 26 to reservoir 28 of toilet 10. The amount of water pumped is determined by signals from two diaphragm pressure switches, 30 and 32 respectively, positioned at different heights within reservoir 28 as shown in FIG. 1. Diaphragm pressure switches 30 and 32 are both electrically connected to control box 24 through wires 34. Diaphragm pressure switch 30 provides an electrical signal to control box 24 when the water level in reservoir 28 falls below the level of diaphragm pressure switch 30, and diaphragm pressure switch 32 provides an electrical signal when the surface of the fluid in the reservoir is below diaphragm pressure switch 32. When the water in reservoir 28 is below diaphragm pressure switch 30, pump 22 is activated. When the water in reservoir 28 rises to diaphragm pressure switch 32, the pump is deactivated to stop the flow of "gray water" into the reservoir.

Reservoir 28 is located above bowl 36 of toilet 10 and is connected through a first conduit 38 to the bowl so that "gray water" leaving the reservoir drains under the influence of gravity from the reservoir into the bowl. First conduit 38 has smooth interior walls so that suspended particulate matter in the "gray water" will not be hung up by surface irregularities in first conduit 38 as the "gray water" drains from the reservoir to the bowl. A reservoir valve 40, which controls the flow of "gray water" in first conduit 38, has a sinkable ball 42 which is biased by gravity to rest upon resilient seat 44. Resilient seat 44 has an inner surface shaped like a truncated cone with an exit opening at the lowest and narrowest part of the cone. Resilient seat 44 is positioned on top of first conduit 38 with the exit opening discharging into the first conduit and with the longitudinal axis of the cone oriented generally vertically. Ball 42 will normally rest against the inner surface of resilient seat 44 to prevent the flow of "gray water" from reservoir 28. This structure is used to prevent hair, and other solids in the "gray water" from clogging reservoir valve 40 as particles in the "gray water" settle around ball 42 or flow through reservoir valve 40 into first conduit 38.

Figure 3:
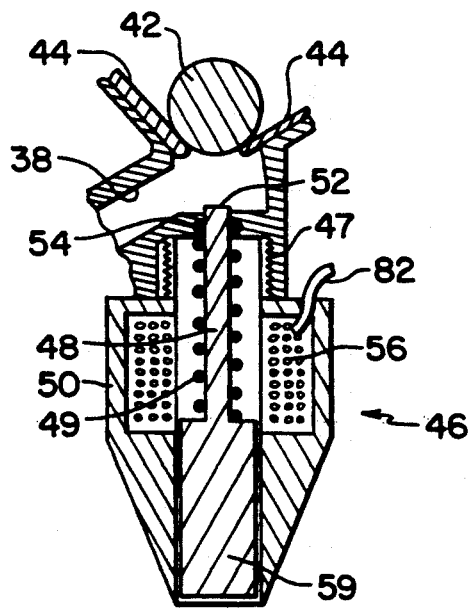
FIG. 3 is a cross-sectional elevational view of a reservoir valve shown as element 40 in FIG. 2 according to the present invention.

Ball 42 is lifted from resilient seat 44 by a first solenoid actuated valve lifter 46. In the preferred embodiment, valve lifter 46 incorporates a first solenoid as best seen in FIG. 3, although a mechanical lifter could be used as effectively to lift ball 42. Valve lifter 46 is threadably attached to toilet 10 by threads on the valve lifter which mate with corresponding threads in opening 47 on toilet 10. Valve lifter 46 has a stem 48 which normally retracts into lifter body 50 under the bias of spring 49, and a guide body 59 connected to the stem as shown in FIG. 3 with an embedded magnetizable substance located adjacent the lower end of the guide body. Stem 48 is encircled by windings 56, and the stem is also positioned through bore 52 in toilet 10. O-ring 54 sealingly and slidingly surrounds stem 48 within bore 52 to prevent "gray water" from exiting first conduit 38 adjacent the stem. Direct current applied to windings 56 in lifter body 50 will lift stem 48 upward by electromagnetic force acting on the magnetizable substance as with a solenoid to extend the stem through bore 52 a sufficient distance to lift ball 42. Lifting ball 42 opens reservoir valve 40 and lets "gray water" flow from reservoir 28 into first conduit 38 and on into bowl 36. When the direct current is cut off, stem 48 retracts into lifter body 50 with O-ring 54 wiping any particles attached to stem 48 off the stem as the stem retracts.

Figure 4:
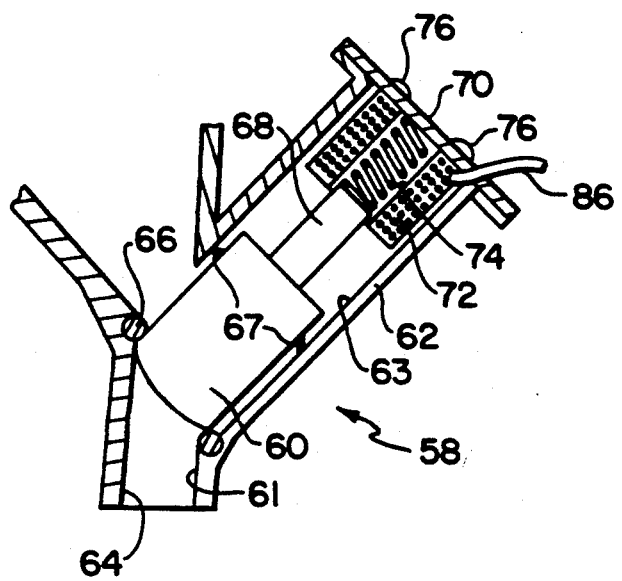
FIG. 4 is a cross-sectional elevational view of a bowl valve shown as element 58 in FIG. 2 according to the present invention.

Adjacent the bottom of bowl 36, a bowl valve 58 is positioned so as to prevent "black water" from leaving the bowl when the bowl valve is in its normally closed position. A piston 60, which includes an embedded magnetizable substance, travels between a closed position and an open position within a corresponding cylinder 63 in housing 62. When piston 60 is in the retracted open position, "black water" can gravity feed from bowl 36 through second conduit 61 and on out through discharge opening 64. In the extended closed position, piston 60 engages O-ring 66 to seal off the bottom of bowl 36 and prevent "black water" from flowing into discharge opening 64. Resilient scrapper 67, surroundingly connected to piston 60 and extending from the piston to housing 62, prevents "black water" from exiting around the piston. Scraper 67 also dislodges adhering particulate matter from the housing as the piston moves from the open to the closed positions. Extending away from the end opposite the end engaging the O-ring on the longitudinal centerline of piston 60, is shaft 68. As best seen in FIG. 4, a spring 70, connected between shaft 68 and housing 62, biases piston 60 to the normally closed position. Coaxially aligned windings 72 form a second solenoid having a cylindrical opening 74 along a longitudinal centerline, the cylindrical opening being sized larger than shaft 68 and spring 70. Whenever direct current is applied to windings 72, the resultant electromagnetic field will act on the magnetizable substance to withdraw piston 60 from the normally closed position and place bowl 36 in fluid communication with discharge opening 64. Windings 72 are held in place by screws 76 which pass through the housing to threadably connect the outer cover of windings 72 to the housing in a conventional manner.

The control panel 24 is connected to a source of DC electrical power 69 and has three electrical switches which can be activated by an operator: switch 80 for 'water', switch 84 for 'drain', and switch 90 for 'flush'. Switch 80, when activated, sends electrical energy along wires 82 to windings 56 of reservoir valve 40 to open the valve and let "gray water" from reservoir 28 flow into bowl 36. Switch 84, when activated, sends electrical energy over wires 86 to windings 72 of bowl valve 58 to open the valve and let "black water" from bowl 36 gravity feed through discharge opening 64. A timer 88 in series with wires 86 delays the closing of bowl valve 58 for a predetermined amount of time after switch 84 is released. Switch 90, when activated, simultaneously opens reservoir valve 40 to let "gray water" flow from reservoir 28 into bowl 36 and also opens bowl valve 58 to let "black water" exit the bowl through discharge opening 64. Whenever both bowl valve 58 and reservoir valve 40 are opened simultaneously, reservoir valve 40 will close a predetermined amount of time before bowl valve 58 closes, as determined by timer 88, which sequence allows "black water" to exit the bowl after the "gray water" has been cut off by reservoir valve 40.

It should be recognized that the electrical switches and electrically-operated valves could as easily be implemented by mechanical equivalents to open and close the valves in a similar fashion in a mechanical system. Using mechanical equivalents, a vacuum chamber using a controlled leak could act in a similar fashion as timer 88 to delay the closing of bowl valve 58.

In operation, "gray water" from water-using devices 12 drains into collecting tank 20 where it is held for future use. A person using toilet 10 can select among the switches on control panel 24 to manage the flow of water through the toilet. Pressing switch 80, opens reservoir valve 40 to let "gray water" flow into bowl 36 to cleanse the bowl. As "gray water" flows through reservoir valve 40, suspended particulate matter flows around ball 42 and across resilient seat 44 to enter bowl 36 and keep the reservoir valve free from clogs. Whenever the "gray water" level drops in reservoir 28 below lower sensor switch 30, pump 22 is activated to pump additional "gray water" into reservoir 28. Then as reservoir 28 fills to above upper sensor switch 32, pump 22 is deactivated to discontinue pumping into the reservoir. Reservoir valve 40 closes whenever switch 80 is released.

Whenever switch 84 is pressed, piston 60 is retracted to open bowl valve 58 and let "black water" exit through discharge opening 64 with timer 88 holding bowl valve 58 open after switch 84 is released until a predetermined time has elapsed. Suspended particulate matter in the "black water" can easily pass by the end of piston 60. Then at the end of the predetermined time as piston 60 moves toward the closed position by the action of biasing spring 70, resilient scrapers 67 scrape the sides of housing 62 to dislodge adhering particulate matter. Piston 60 in the fully extended, and closed, position cuts the path of fluid communication between bowl 36 and discharge opening 64.

Whenever switch 90 is pressed, both reservoir valve 40 and bowl valve 58 are opened to permit "grey water" to enter bowl 36 and "black water" to exit the bowl. When switch 90 is released, reservoir valve 40 closes with timer 88 continuing to hold bowl valve 58 open for a predetermined time to permit the contents of the bowl to be drained. After the predetermined time lapses, bowl valve 58 closes.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A gray water toilet system using previously used water containing suspended particulate matter for flushing, the system comprising:
   a toilet having a bowl with a discharge opening below the bowl for discharging fluid in the bowl into a sewer line;
   a reservoir holding fluid above the bowl;
   a discharge passage to allow fluid in the reservoir to flow into the toilet bowl;
   a reservoir valve located in the discharge passage which in an open position allows fluid to flow into the toilet bowl and which in a closed position prevents fluid from flowing into the toilet bowl;
   the reservoir valve including a sinkable sphere for resting in a seat, in which position the reservoir valve is at the closed position;
   the seat having an inner surface shaped as a truncated cone with a longitudinal axis positioned generally vertically, the inner surface having an opening at the narrowest part of the cone adjacent a bottom of the seat and opening into the bowl;
   an electrically actuated solenoid lifting device including a stem element positioned for engagement with the sinkable sphere;
   the solenoid lifting device, upon actuation, moves the stem upwardly pushing the sinkable sphere upwardly and out of the seat to open the reservoir valve;
   a bowl valve positioned in the discharge opening which in an open position allows fluid in the bowl to be discharged into the sewer line and which in a closed position prevents fluid from being discharged into the sewer line;
   the bowl valve including a piston moveable into the discharge opening to close the bowl valve and movable out of the discharge opening to open the bowl valve;
   means for biasing the bowl valve piston to the closed position;
   an electrically actuated solenoid which upon actuation moves the piston against the force of the biasing means to open the bowl valve; and
   an electrical control means for controlling the actuation of the reservoir valve solenoid and the bowl valve solenoid independently of one another;
   the electrical control means further including a selectively actuated timer means for delaying the closing of the bowl valve until after the reservoir valve is closed.

* * * * *